United States Patent
Straninger

(10) Patent No.: US 11,052,957 B2
(45) Date of Patent: Jul. 6, 2021

(54) CROSS-LINK FOR A TRACK OF A TRACKED VEHICLE, IN PARTICULAR A SNOW GROOMER

(71) Applicant: Prinoth S.p.A., Vipiteno (IT)

(72) Inventor: Markus Straninger, Vomp (AT)

(73) Assignee: Prinotb S.p.A., Vipiteno (IT)

(*) Notice: Subject to any disclaimer, the term of this patent is extended or adjusted under 35 U.S.C. 154(b) by 349 days.

(21) Appl. No.: 15/999,074

(22) PCT Filed: Feb. 20, 2017

(86) PCT No.: PCT/IB2017/050961
§ 371 (c)(1),
(2) Date: Aug. 17, 2018

(87) PCT Pub. No.: WO2017/141226
PCT Pub. Date: Aug. 24, 2017

(65) Prior Publication Data
US 2019/0256158 A1    Aug. 22, 2019

(30) Foreign Application Priority Data
Feb. 18, 2016   (IT) ................. 102016000017041

(51) Int. Cl.
*B62D 55/28*   (2006.01)
*B62D 55/253*   (2006.01)

(52) U.S. Cl.
CPC ......... *B62D 55/286* (2013.01); *B62D 55/253* (2013.01)

(58) Field of Classification Search
CPC ......................... B62D 55/286; B62D 55/253
See application file for complete search history.

(56) References Cited

U.S. PATENT DOCUMENTS

| | | |
|---|---|---|
| 5,015,219 A | 5/1991 | Jäger |
| 5,265,949 A | 11/1993 | Haug |

(Continued)

FOREIGN PATENT DOCUMENTS

| | | |
|---|---|---|
| DE | 35 33 933 | 3/1987 |
| EP | 1 674 382 | 6/2006 |

(Continued)

OTHER PUBLICATIONS

Notification Concerning Submission, Obtention or Transmittal of Priority Document for International Application No. PCT/IB2017/050961 dated Apr. 21, 2017.

(Continued)

*Primary Examiner* — Kip T Kotter
(74) *Attorney, Agent, or Firm* — Neal, Gerber & Eisenberg LLP

(57) ABSTRACT

A cross-link for a track of a tracked vehicle, in particular a snow groomer, configured to advance along delicate ground, and which extends along a designated plane and has a mounting member comprising a wall configured for being arranged in contact with the delicate ground; a blade, which protrudes from the wall, is fixed to the wall and has a free edge, wherein the wall and the blade are configured so as to define two support surfaces extending on opposite sides of the blade to enable the sinking of the blade into the delicate ground and prevent the sinking of the mounting member.

14 Claims, 2 Drawing Sheets

(56) References Cited

U.S. PATENT DOCUMENTS

| | | | |
|---|---|---|---|
| 6,296,330 B1 * | 10/2001 | Hall | B62D 55/27 |
| | | | 305/161 |
| 2008/0309157 A1 | 12/2008 | Runggaldier et al. | |
| 2010/0225160 A1 * | 9/2010 | Rainer | B62D 55/286 |
| | | | 305/191 |
| 2011/0163595 A1 * | 7/2011 | Kirchmair | B62D 55/21 |
| | | | 305/46 |

FOREIGN PATENT DOCUMENTS

| | | | | |
|---|---|---|---|---|
| EP | 2778028 A2 * | 9/2014 | | B62D 55/26 |
| FR | 2 456 656 | 12/1980 | | |

OTHER PUBLICATIONS

Notification of Transmittal of the International Search Report and the Written Opinion for International Application No. PCT/IB2017/050961 dated Jun. 21, 2017.
PCT Demand for International Preliminary Examination and Reply to International Search Report and the associated Written Opinion for International Application No. PCT/IB2017/050961 dated Dec. 14, 2017.
Notification of Receipt of Demand by International Preliminary Examining Authority for International Application No. PCT/IB2017/050961 dated Dec. 22, 2017.
Notification of Transmittal of the International Preliminary Report on Patentability (Form PCT/IPEA/416) for International Application No. PCT/IB2017/050961 dated Jan. 29, 2018.
Chinese Office Action for Application No. 201780002833.3 dated Jun. 28, 2020 (7 pages).

* cited by examiner

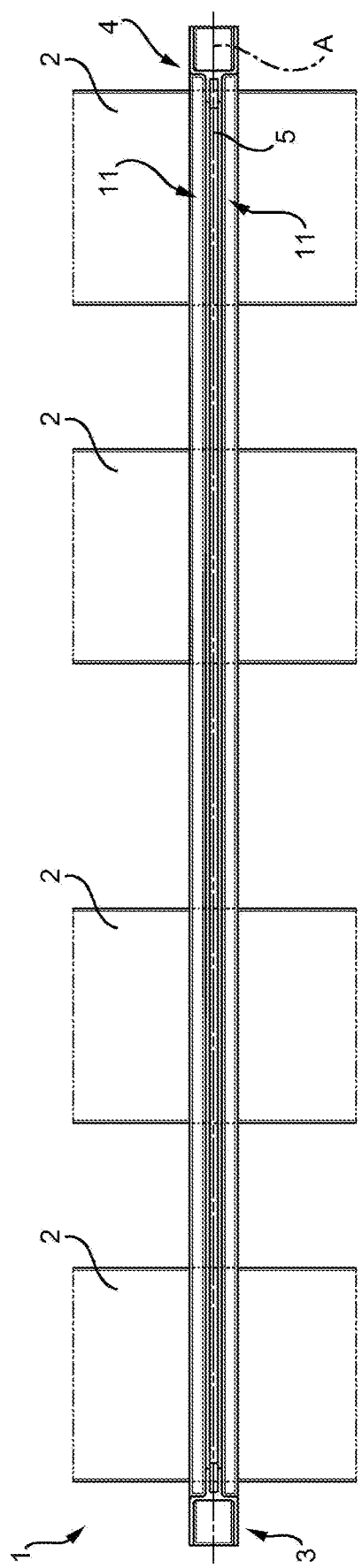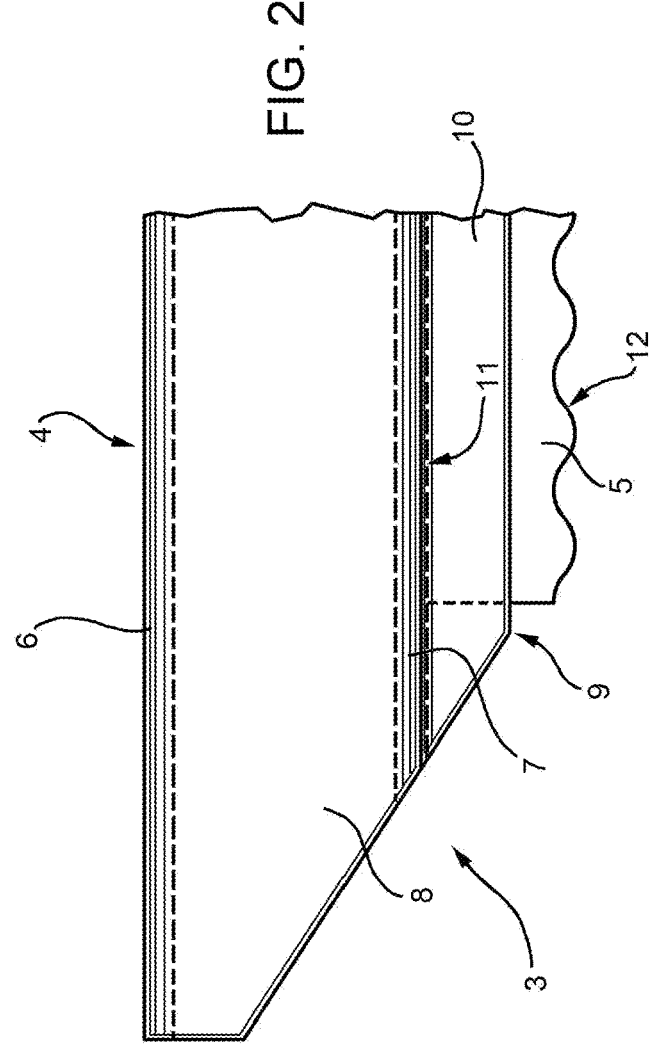

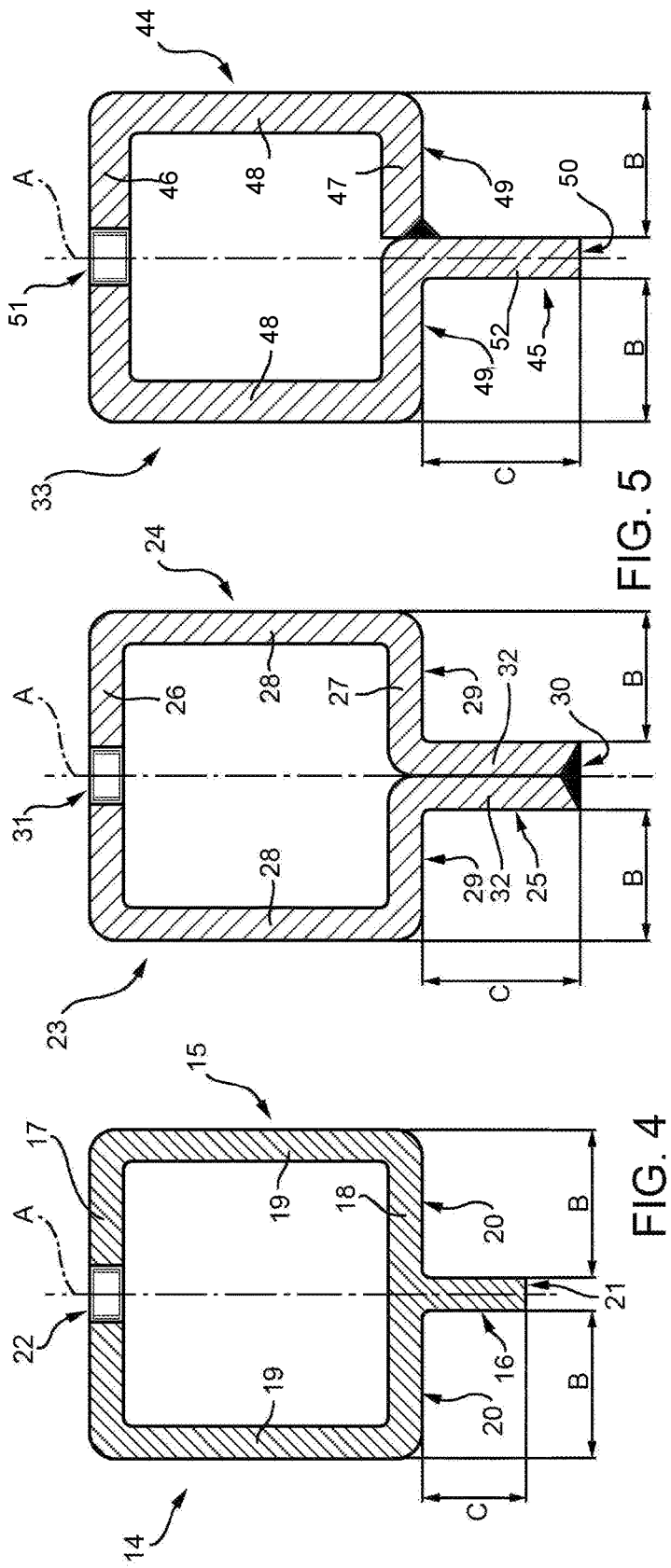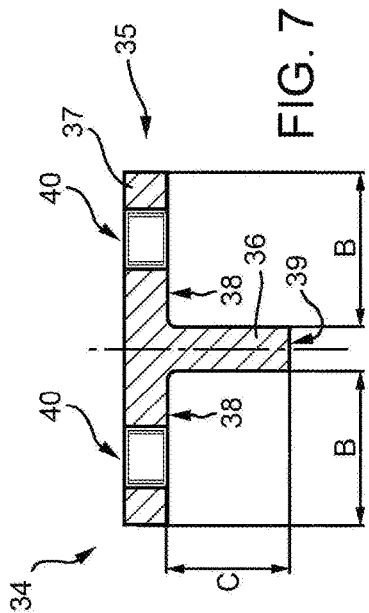

CROSS-LINK FOR A TRACK OF A TRACKED VEHICLE, IN PARTICULAR A SNOW GROOMER

PRIORITY CLAIM

This application is a national stage application of PCT/IB2017/050961, filed on Feb. 20, 2017, which claims the benefit of and priority to Italian Patent Application No. 102016000017011, filed on Feb. 18, 2016, the entire contents of which are each incorporated by reference herein.

TECHNICAL FIELD

The present disclosure relates to a cross-link for a track of a tracked vehicle, in particular a snow groomer.

BACKGROUND

In general, certain snow groomers have tracks, each of which comprises a plurality of continuous-loop rubber belts and a plurality of cross-links that are fixed to the rubber belts and extend perpendicularly to the belts. A cross-link for snow groomer tracks comprises a mounting member configured to be fixed to the rubber belts and a blade fixed to the mounting member. The blade is configured to sink into the snow cover and into ice, enabling a secure grip for the track and ensuring a high level of safety for the snow groomer's driver, even when the snow groomer operates on very steep slopes and on icy ground. A cross-link of the above-indicated type is described in U.S. Patent Application 2008/0309157.

Documents DE 35,33,933, FR 2,456,656, and EP 1,674,382 disclose cross-links, which are configured to penetrate as much as possible into the snow cover because they have a long blade with respect to the mounting member or because they are provided with a blade-shaped mounting member that penetrates the snow cover.

Recently, tracked vehicles designed for being connected to equipment for grooming ski runs have also found uses outside of the skiing season. These snow groomers are often used to advance over delicate surfaces, such as pastureland for example. Traditional cross-links move the topsoil too much, damaging the pasture. In effect, the traditional cross-link often cuts the top layer of the snow cover on which they normally operate. In the case of ski run grooming, the "cutting" performed by the tracks is a desired effect, while on other surfaces, the effect is undesired.

SUMMARY

One advantage of the present disclosure is to provide a cross-link that is able to mitigate certain of the drawbacks of certain of the known art without impairing the gripping capability of the track and the lateral stability of the tracked vehicle.

In accordance with the present disclosure, a cross-link is provided for a track of a tracked vehicle, in particular a snow groomer, configured to advance along delicate ground, the cross-link extending parallel to a given or designated plane and comprising a mounting member comprising a wall configured for being arranged in contact with the delicate ground; a blade, which protrudes from the wall, is fixed to the wall and has a free edge, wherein the wall and the blade are configured so as to define two support surfaces extending on opposite sides of the blade to allow the sinking of the blade into the delicate ground and prevent the sinking of the mounting member wherein the two support surfaces have the same area, the same width and the blade protrudes for a distance from the wall, said distance being less than twice said width. In this way, by sizing the blade, it is possible to control the sinking and prevent damaging the delicate ground.

In practice, the blade is supported in the same way on opposite sides of the blade.

In particular, the two support surfaces have the same width to prevent the blade from tending to tilt.

In particular, the blade has a depth that is less than twice said width. In certain embodiments, the depth of the blade is greater than the width of one support surface.

In general, the two support surfaces are symmetrical with respect to said given plane and the blade extends along said given plane. Therefore, when the blade is completely sunk into the delicate ground, the cross-link is equally stressed by the opposite sides of the blade.

In particular, the free edge of the blade is indented such that the blade adheres to the delicate ground in directions parallel to the blade.

In one embodiment of the present disclosure, the mounting member and the blade are assembled with one another, and the mounting member has a seat configured to house the blade and is made by extrusion. This embodiment is used, for example, when the materials of the mounting member and the blade are different.

According to other embodiments of the present disclosure, the mounting member and the blade are made in a single piece. In particular, the mounting member and the blade can be made by extrusion or by folding and welding a metal blank.

Additional features and advantages are described in, and will be apparent from the following Detailed Description and the figures.

BRIEF DESCRIPTION OF THE DRAWINGS

Other characteristics and advantages of the present disclosure will become clear from the description that follows and its non-limitative examples of embodiment, with reference to the accompanying drawings, in which:

FIG. 1 is a plan view, with parts removed for clarity, of a track comprising cross-links made in accordance with a first embodiment of the present disclosure;

FIG. 2 is an elevation view, with parts removed for clarity and on an enlarged scale, of the cross-link shown in FIG. 1;

FIG. 3 is a cross-sectional view, with parts removed for clarity, of a detail of the cross-link in FIG. 2 along section lines II-II;

FIG. 4 is a cross-sectional view, with parts removed for clarity, of a second embodiment of the present disclosure;

FIG. 5 is a cross-sectional view, with parts removed for clarity, of a third embodiment of the present disclosure;

FIG. 6 is a cross-sectional view, with parts removed for clarity, of a fourth embodiment of the present disclosure; and FIG. 7 is a cross-sectional view, with parts removed for clarity, of a fifth embodiment of the present disclosure.

DETAILED DESCRIPTION

Referring now to the example embodiments of the present disclosure illustrated in FIGS. 1 to 7 and specifically referring to FIG. 1, reference numeral 1 indicates, as a whole, a track for a tracked vehicle, in particular for a snow groomer (not shown in the accompanying figures). The track 1 comprises a plurality of continuous-loop rubber belts 2 and a plurality of cross-links 3 (only one of which is shown in the accompanying figures) evenly distributed along the belts 2 and arranged transversely with respect to the belts 2.

The cross-links 3 have the function of gripping the delicate ground on which the snow groomer advances, as well as in a direction transversal to the direction of travel and in dry or wet weather conditions. Furthermore, the cross-links 3, which are distributed with a constant distribution gap along the belts 2, also have the function, in certain of the disclosed embodiments, of meshing with a drive wheel (not shown in the accompanying figures).

Each cross-link 3 comprises a mounting member 4 and a blade 5, which protrudes from the mounting member 4.

Referring to FIG. 2, the mounting member 4 and the blade 5 extend along an axis A.

Referring to FIG. 3, the mounting member 4 is defined by an aluminium section and has a wall 6 configured for being fixed to the track 1 (FIG. 1); a wall 7 facing wall 6 and configured for being arranged in contact with the delicate ground; and two lateral walls 8 that connect walls 6 and 7 to one another. The mounting member 4 also comprises a seat 9 configured to house the blade 5. In the case shown in FIG. 3, the seat 9 is delimited by two flanges 10, which protrude from wall 7 and face each other. In particular, the flanges 10 extend parallel to plane A and both are perpendicular to wall 7. The seat 9 extends parallel to plane A and is arranged in a central position with respect to wall 7 so as to define two support surfaces 11 along wall 7.

The blade 5 is partly housed inside the seat 9 and in contact with the flanges 10 and partly protrudes with respect to the flanges 10. The blade 5 is fixed to the mounting member 4 by various techniques, such as, for example, riveting, gluing and welding. This last technique is used when the mounting member 4 and the blade 5 are made of the same material.

The blade 5 protrudes with respect to the flanges 10 and has a free edge 12, undulated as shown in FIG. 2.

Each support surface 11 extends for a distance B with respect to the adjacent flange 10, while the free edge 12 has a maximum distance C with respect to the support surfaces 11. In certain embodiments, the maximum distance C is in the range between 13 and 17 mm. Whereas distance B is calculated such that twice distance B is greater than the maximum distance C. In this way, it is possible to ensure that penetration into the delicate ground is limited to the maximum distance C. In particular, the support surfaces 11 limit the sinking of the cross-link 3.

Sinking that is limited to the maximum distance C enables good traction and good grip, and the toothed free edge 12 prevents and/or limits sideways slippage of the cross-link along axis A.

Referring to FIGS. 1 and 2, the cross-link 3 has respective opposite ends tapered towards wall 6.

Referring to FIG. 3, the mounting member 4 has openings 13 (only one of which is shown in FIG. 3) distributed along axis A. Each opening 13 is threaded and/or enables the passage of screws (not shown in the accompanying figures).

In particular, the mounting member 4 is made from an extruded aluminium section, conveniently with a cross-section shaped as shown in the cross-sectional view. In certain embodiments, the blade 5 is made of steel and is fixed to the mounting member 4 by gluing or with rivets (not shown in the accompanying figures).

Referring to the variant in FIG. 4, reference numeral 14 indicates a cross-link that comprises a mounting member 15 with a closed ring-like section and a blade 16, which protrudes from the mounting member 15. In the case shown, the cross-link 14 is made in a single piece. In other words, the mounting member 15 and the blade 16 form a single piece.

The mounting member 15 and the blade 16 extend parallel to a plane A. The mounting member 15 has a wall 17 configured for being fixed to the track 1 (FIG. 1); a wall 18 facing wall 17 and configured for being arranged in contact with the delicate ground; and two lateral walls 19 that connect walls 17 and 18 to one another.

The blade 16 extends parallel to plane A and is arranged in a central position with respect to wall 18 so as to define two support surfaces 20 along wall 18 and has an undulated or indented free edge 21.

Each support surface 20 extends for a distance B with respect to the blade 16, while the free edge 21 has a maximum distance C with respect to the support surfaces 20. In certain embodiments, the maximum distance C is in the range between 13 and 17 mm. Whereas distance B is calculated such that twice distance B is greater than the maximum distance C.

The mounting member 15 has openings 22 (only one of which is shown in FIG. 4) distributed along wall 17. Each opening 22 is threaded and/or enables the passage of fastening members, such as screws (not shown in the accompanying figures).

In particular, the mounting member 15 is made from an extruded aluminium section with a cross-section shaped as shown in the cross-sectional view in FIG. 4.

Referring to the variant in FIG. 5, reference numeral 23 indicates a cross-link that comprises a mounting member 24 with a closed ring-like section and a blade 25, which protrudes from the mounting member 24. In the case shown, the cross-link 23 is made in a single piece. In other words, the mounting member 24 and the blade 25 form a single piece.

The mounting member 24 and the blade 25 extend along an axis A. The mounting member 24 has a wall 26 configured for being fixed to the track 1 (FIG. 1); a wall 27 facing wall 26 and configured for being arranged in contact with the delicate ground; and two lateral walls 28 that connect walls 26 and 27 to one another.

The blade 25 extends parallel to plane A and is arranged in a central position with respect to wall 27 so as to define two support surfaces 29 along wall 27 and has an undulated or indented free edge 30.

Each support surface 29 extends for a distance B with respect to the blade 25, while the free edge 30 has a maximum distance C with respect to the support surfaces 29. In certain embodiments, the maximum distance C is in the range between 13 and 17 mm. Whereas distance B is calculated such that twice distance B is greater than the maximum distance C.

The mounting member 24 has openings 31 (only one of which is shown in FIG. 5) distributed along wall 26. Each opening 31 is threaded and/or enables the passage of fastening members, such as screws (not shown in the accompanying figures).

In particular, the cross-link 23 is made from a steel blank folded so as to define the mounting member 24 and the blade 25. In particular, the blade 25 is formed by two strips 32 of the blank in reciprocal contact and joined together. The strips can be joined together by gluing and/or various welding methods.

In the variant in FIG. 6, the cross-link 33, which has similar geometric characteristics to cross-link 23 and is formed from a blank. In this case, the blade 45 is formed by a single strip 52, while the other free end of the blank is fixed to the base of the strip 52. As seen in FIG. 6, the mounting member 44 and the blade 45 extend along an axis A, wherein the mounting member 44 has a wall 46 configured for being fixed to the track 1 (FIG. 1); a wall 47 facing wall 46 and configured for being arranged in contact with the delicate ground; and two lateral walls 48 that connect walls 46 and 48 to one another. The blade 45 extends parallel to plane A and is arranged in a central position with respect to wall 47 so as to define two support surfaces 49 along wall 47 and has an undulated or indented free edge 50. The mounting member 44 has openings 51 (only one of which is shown in FIG. 6) distributed along wall 46. Each opening 51 is threaded and/or enables the passage of fastening members, such as screws (not shown in the accompanying figures). In practice, cross-link 23 in FIG. 5 has twice the thickness of the blank, while cross-link 52 in FIG. 6 has the same thickness as the blank.

Referring to the variant in FIG. 7, reference numeral 34 indicates a cross-link that comprises a plate-like mounting member 35 and a blade 36, which protrudes from the mounting member 35. In the case shown, the cross-link 34 is made in a single piece. In other words, the mounting member 35 and the blade 36 form a single piece.

The mounting member 35 and the blade 36 extend along an axis A. The mounting member 35 comprises a single wall 37 from which the blade 36 protrudes. The blade 36 extends parallel to plane A and is arranged in a central position with respect to wall 37 so as to define two support surfaces 38 along wall 27 and has an undulated or indented free edge 39.

Each support surface 38 extends for a distance B with respect to the blade 36, while the free edge 39 has a maximum distance C with respect to the support surfaces 38. In certain embodiments, the maximum distance C is in the range between 13 and 17 mm. Whereas distance B is calculated such that twice distance B is greater than the maximum distance C.

The mounting member 35 has two rows of openings 40 (only two of which are shown in FIG. 7) distributed along wall 37. Each opening 40 is threaded and/or enables the passage of fastening members, such as screws (not shown in the accompanying figures).

In particular, the cross-link 34 is made from an extruded aluminium section.

Furthermore, it is evident that the present disclosure also covers embodiments not described in the detailed description and equivalent embodiments that fall within the scope of the appended claims. As such, the present disclosure also covers embodiments not described in the detailed description and equivalent embodiments that fall within scope of the appended claims. Accordingly, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A cross-link for a track of a tracked vehicle configured to advance along delicate ground, the cross-link extending parallel to a designated plane and comprising:
   a mounting member comprising a wall configured for being arranged in contact with the delicate ground; and
   a blade having a free edge and being fixed to the wall, wherein the wall and the blade are configured to define two support surfaces extending on opposite sides of the blade, the two support surfaces enable a sinking of the blade into the delicate ground and prevent a sinking of the mounting member into the delicate ground, wherein the two support surfaces each have a same area and a same width such that the blade protrudes a distance from the wall which is less than twice the width of either of the two support surfaces, the distance that the blade protrudes from the wall being within a range of thirteen millimeters to seventeen millimeters.

2. The cross-link of claim 1, wherein the distance the blade protrudes from the wall is greater than the width of either of the two support surfaces.

3. The cross-link of claim 1, wherein the blade extends along the designated plane and the two support surfaces are symmetrical with respect to the designated plane.

4. The cross-link of claim 1, wherein the free edge of the blade is indented.

5. The cross-link of claim 1, wherein the mounting member has an opening configured to house a fastening member.

6. The cross-link of claim 1, wherein the mounting member and the blade are assembled with one another, the mounting member has a seat configured to house the blade and the mounting member is extruded.

7. The cross-link of claim 1, wherein the mounting member and the blade comprise a single piece.

8. The cross-link of claim 7, wherein the mounting member and the blade are extruded as the single piece.

9. The cross-link of claim 7, wherein the single piece of the mounting member and the blade is made by folding and welding a metal blank.

10. The cross-link of claim 1, wherein the tracked vehicle comprises a snow groomer.

11. The cross-link of claim 1, wherein the two support surfaces are each perpendicular to the blade.

12. A track for a tracked vehicle, the track comprising:
   a plurality of continuous-loop rubber belts, and
   a plurality of cross-links, each of which is mounted on the belts transversely to the belts and each of which comprises:
      a mounting member comprising a wall configured for being arranged in contact with delicate ground, and
      a blade having a free edge and being fixed to the wall, wherein the wall and the blade are configured to define two support surfaces extending on opposite sides of the blade, the two support surfaces enable a sinking of the blade into the delicate ground and prevent a sinking of the mounting member into the delicate ground, wherein the two support surfaces each have a same area and a same width such that the blade protrudes a distance from the wall which is less than twice the width of either of the two support surfaces, the distance that the blade protrudes from the wall being within a range of thirteen millimeters to seventeen millimeters.

13. The track of claim 12, wherein the tracked vehicle comprises a snow groomer.

14. The track of claim 12, wherein for each of the plurality of cross-links, the two supports surfaces of that cross-link are each perpendicular to the blade of that cross-link.

* * * * *